(12) United States Patent
Li et al.

(10) Patent No.: US 12,034,871 B2
(45) Date of Patent: Jul. 9, 2024

(54) CERTIFICATE STATUS DETERMINING METHOD

(71) Applicant: Huawei Cloud Computing Technologies Co., Ltd., Guizhou (CN)

(72) Inventors: Fei Li, Shenzhen (CN); Jintao Zhu, Xi'an (CN); Chengdong He, Shenzhen (CN); Tao Bai, Shenzhen (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 615 days.

(21) Appl. No.: 17/182,493

(22) Filed: Feb. 23, 2021

(65) Prior Publication Data
US 2021/0176080 A1 Jun. 10, 2021

Related U.S. Application Data

(63) Continuation of application No. PCT/CN2019/098056, filed on Jul. 27, 2019.

(30) Foreign Application Priority Data

Aug. 25, 2018 (CN) .......................... 201810976472.9

(51) Int. Cl.
H04L 9/32 (2006.01)
H04W 4/40 (2018.01)

(52) U.S. Cl.
CPC ........ H04L 9/3268 (2013.01); H04L 2209/84 (2013.01); H04W 4/40 (2018.02)

(58) Field of Classification Search
CPC ... H04L 9/3268; H04L 2209/84; H04L 67/12; H04L 63/0823; H04W 4/40; H04W 4/44; H04W 4/46; H04W 12/043
See application file for complete search history.

(56) References Cited

U.S. PATENT DOCUMENTS

| 5,745,574 A | 4/1998 | Muftic |
| 2004/0093493 A1 | 5/2004 | Bisbee et al. |

(Continued)

FOREIGN PATENT DOCUMENTS

| CN | 1682490 A | 10/2005 |
| CN | 102236753 A | 11/2011 |

(Continued)

OTHER PUBLICATIONS

Di Crescenzo, G., et al., "Efficient CRL Search in Vehicular Network PKIs", Digital Identity Management, ACM, 2 Penn Plaza, Suite 701 New York NY 10121-0701 USA, Oct. 8, 2010, 10 pages.

(Continued)

Primary Examiner — Taghi T Arani
Assistant Examiner — Blake I Narramore
(74) Attorney, Agent, or Firm — Conley Rose, P.C.

(57) ABSTRACT

In a method for enabling a message receive end to quickly confirm a certificate status, a defined field of a certificate includes classification information of the certificate, and a defined field of a certificate revocation list includes classification information of a revoked certificate, so that the receive end can quickly narrow a searching or matching range in massive records of the certificate revocation list based on the classification information carried in the certificate of a transmit end.

20 Claims, 6 Drawing Sheets

(56) References Cited

U.S. PATENT DOCUMENTS

| | | |
|---|---|---|
| 2005/0278534 A1 | 12/2005 | Nadalin et al. |
| 2009/0187983 A1 | 7/2009 | Zerfos et al. |
| 2011/0083011 A1 | 4/2011 | Dicrescenzo |
| 2011/0258435 A1 | 10/2011 | Bellur et al. |
| 2016/0149890 A1* | 5/2016 | Ujiie .............. H04L 63/08 726/3 |
| 2017/0288880 A1* | 10/2017 | Brockhaus .......... H04L 9/3263 |
| 2017/0374033 A1* | 12/2017 | Kovacs .............. H04L 9/3263 |
| 2018/0006829 A1* | 1/2018 | Kravitz ............... H04W 12/06 |
| 2018/0107532 A1* | 4/2018 | Park .................. H04W 4/40 |
| 2018/0123805 A1* | 5/2018 | Veladanda .......... H04L 9/3263 |
| 2018/0137261 A1* | 5/2018 | Lattin ................ H04W 4/50 |
| 2018/0176209 A1* | 6/2018 | Narayanan .......... H04W 48/10 |
| 2018/0189103 A1* | 7/2018 | Teshler ............... G06F 9/545 |
| 2018/0220282 A1* | 8/2018 | Stählin ............ H04L 63/0823 |
| 2019/0379548 A1* | 12/2019 | Barrett .............. H04W 12/108 |

FOREIGN PATENT DOCUMENTS

| | | |
|---|---|---|
| CN | 106330449 A | 1/2017 |
| CN | 107508682 A | 12/2017 |
| CN | 107786515 A | 3/2018 |
| CN | 108092777 A | 5/2018 |
| EP | 3226464 A1 | 10/2017 |
| JP | 2016220259 A | 12/2016 |
| WO | 2015111107 A1 | 7/2015 |
| WO | 2018150546 A1 | 8/2018 |

OTHER PUBLICATIONS

Sing, J., et al.,"A Single-hop based fast Certificate Revocation Protocol in VANET", 2016 International Conference on Computational Intelligence and Networks, 6 pages.

Triki, B., et al., "A Privacy Preserving Solution for the Protection Against Sybil Attacks in Vehicular Ad Hoc Networks", IFIP WMNC 2013, 8 pages.

* cited by examiner

| 0 | 0 | 1 | 0 | 0 | 1 | 0 | 1 | 0 | 0 | 0 | 0 | 0 | 0 | 0 | 0 |

CERTIFICATE STATUS DETERMINING METHOD

CROSS-REFERENCE TO RELATED APPLICATIONS

This is a continuation of Int'l Patent App. No. PCT/CN2019/098056, filed on Jul. 27, 2019, which claims priority to Chinese Patent App. No. 201810976472.9, filed on Aug. 25, 2018, both of which are incorporated by reference.

FIELD

This disclosure relates to the communications field, and in particular, to a certificate status determining method, an apparatus, and a system during communication between devices in the vehicle-to-everything (V2X) field.

BACKGROUND

V2X is a communications system between vehicles, between vehicles and pedestrians or riders, or between vehicles and infrastructure. V2X communication features a large quantity of messages and a high message sending and receiving frequency. For example, an on-board unit (OBU) or a roadside unit (RSU) periodically (for example, 10 kilohertz (kHz)) sends a cooperative awareness message (CAM) for describing a vehicle running status (a speed, an orientation, and a direction), or when a special event occurs, sends a decentralized environmental notification message (DENM) for describing an event type.

For security, a certificate is usually used in the communications system to perform data source authentication. For example, a transmit end adds the certificate to a sent message, and a receive end verifies the certificate carried in the message, including verifying whether the certificate is revoked. In the traditional internet communications field, an online certificate status protocol (OCSP) solution is used. To be specific, a client uses an OCSP to query whether the certificate is revoked on an OCSP server in real time.

In the V2X communication, the certificate is also required for the data source authentication. However, the traditional OCSP solution is not available to a V2X communication scenario. The CAM message is used as an example. A vehicle broadcasts 10 CAM messages per second. Theoretically, all vehicles within 1 km by using the vehicle as a center will receive the broadcast CAM messages. If the OCSP solution is used, each vehicle that receives the CAM messages needs to query a certificate in each CAM message in real time. This imposes heavy burden on performance and network bandwidth of the OCSP server. Further, communication between the vehicle and the OCSP server causes an extra latency of the V2X communication.

Therefore, to meet real-time and security requirements in the V2X communication, a more efficient method for determining whether the certificate is revoked is urgently needed.

SUMMARY

To meet real-time and security requirements in V2X communication, this disclosure provides a method for enabling a message receive end to quickly confirm a certificate status. The certificate status refers to whether a certificate is revoked.

An embodiment provides a solution based on a certificate revocation list. Two concepts are proposed in the solution: classification information of a certificate and feature information of the certificate. The classification information of the certificate refers to category information allocated by a certificate issuance server to the certificate when the certificate is issued, and is used to classify the certificate. The feature information of the certificate may refer to information that can be used to uniquely identify one certificate. The feature information of the certificate may be a random number of n bytes allocated by the certificate issuance server to the certificate when the certificate is issued, or may be a value of n bytes intercepted after hash calculation is performed on the certificate.

In this embodiment of, a defined field of the certificate includes the classification information of the certificate, and a defined field of the certificate revocation list includes classification information of a revoked certificate. In addition, when the feature information of the certificate is the random number of the n bytes allocated by the certificate issuance server to the certificate when the certificate is issued, in a possible implementation, the feature information of the certificate may be included in a defined field of the certificate. In addition to recording the classification information of the revoked certificate, the certificate revocation list further needs to include feature information of the revoked certificate in a defined field.

The certificate revocation list is generated and maintained by a certificate revocation server. A V2X communications unit, for example, a receive end and a transmit end, obtains the certificate revocation list from the certificate revocation server. After receiving a message, the receive end verifies a certificate of the transmit end that sends the message based on the stored certificate revocation list, to determine a status of the certificate. The defined field of the certificate includes the classification information of the certificate, and the defined field of the certificate revocation list includes the classification information of the revoked certificate, so that the receive end can quickly narrow a searching or matching range in massive records of the certificate revocation list based on classification information carried in the certificate of the transmit end, to improve a speed and efficiency of verifying the certificate. Specifically, the receive end determines, in the certificate revocation list, a record set of revoked certificates that have same classification information as the certificate of the transmit end, and further determines, in the set, a record of a revoked certificate that has same feature information as the certificate of the transmit end. If there is a matching record, the certificate of the transmit end is revoked. If there is no matching record, the certificate of the transmit end is not revoked.

In addition, an embodiment further provides a solution based on a certificate revocation fingerprint library. A certificate revocation server records fingerprint information of a revoked certificate into the certificate revocation fingerprint library. A V2X communications unit, for example, a receive end and a transmit end, obtains the certificate revocation fingerprint library from the certificate revocation server. After receiving a message, the receive end extracts fingerprint information of a certificate of the transmit end that sends the message, and verifies the certificate of the transmit end that sends the message based on the stored certificate revocation fingerprint library, to determine a status of the certificate. To improve communication efficiency, in this embodiment, the certificate revocation server maintains a certificate revocation fingerprint location library, to store a change recorded in the certificate revocation fingerprint library in a time period. The V2X communications unit obtains the certificate revocation fingerprint location library, to refresh the stored certificate revocation fingerprint library. To improve accuracy of the solution that is based on certificate revocation fingerprint library, this embodiment further proposes a solution in which the transmit end self-verifies whether the certificate is revoked, to ensure that the certificate carried in the message is a certificate that has no matching record in the certificate revocation fingerprint library, so as to avoid a false positive of the receive end.

To cooperate with the method described in the claims, the receive end also needs to make corresponding improvements, to support the certificate status determining method in the embodiments.

In the solution that is based on certificate revocation list, the message sent by the transmit end to the receive end includes the certificate of the transmit end. Because the certificate of the transmit end includes the classification information, the receive end may match the classification information of the certificate of the transmit end with the classification information of the revoked certificate in the certificate revocation list, and determine the status of the certificate of the transmit end based on a matching result.

In the solution that is based on the certificate revocation fingerprint library, the transmit end determines, based on the stored certificate revocation fingerprint library, a certificate that has no matching record in the certificate revocation fingerprint library, and uses the selected certificate in the sent message.

In a possible implementation, the transmit end calculates fingerprint information of any certificate of the transmit end. If the transmit end determines that there is no fingerprint information that matches the fingerprint information of the certificate in the certificate revocation fingerprint library, the transmit end uses the certificate in the sent message.

In another possible implementation, the transmit end calculates fingerprint information of any certificate of the transmit end. If the transmit end determines that there is fingerprint information that matches the fingerprint information of the certificate in the certificate revocation fingerprint library, the transmit end selects a second certificate different from the certificate, continues to calculate fingerprint information of the second certificate, and determines whether there is fingerprint information that matches the fingerprint information of the second certificate in the certificate revocation fingerprint library.

The method in the embodiments relates to apparatuses such as the receive end, the transmit end, the certificate revocation server, and a V2X server. Therefore, the embodiments of further provide an apparatus and a server for implementing the foregoing certificate verification method.

In addition, an embodiment further provides a computer-readable storage medium. The computer-readable storage medium stores an instruction. When the instruction is run on a computer, the computer is enabled to perform the foregoing certificate verification method.

Finally, this disclosure provides a computer program product including an instruction. When the computer program product runs on a computer, the computer is enabled to perform the foregoing certificate verification method.

DETAILED DESCRIPTION

To meet real-time and security requirements in V2X communication, the embodiments provide a method for determining whether a certificate is revoked with higher efficiency than in other approaches. It should be noted that the certificate in the embodiments is a digital certificate used in the communications field.

Figure 1:
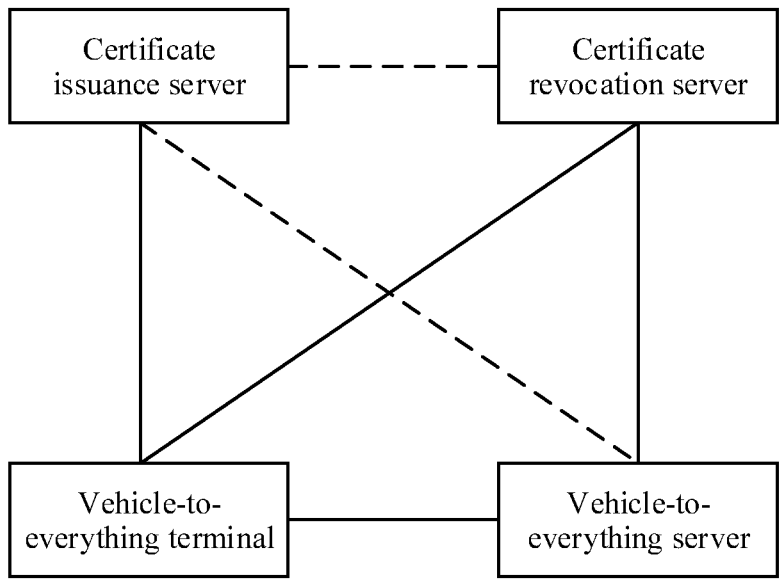
FIG. 1 is an architectural diagram of a V2X system according to an embodiment.

FIG. 1 shows an architecture of a V2X system according to an embodiment. The system includes a certificate issuance server, a certificate revocation server, a V2X server, and a V2X terminal. The V2X terminal may also be a V2X apparatus or device, for example, a communications apparatus carried by an on-board unit, a road side unit, or a pedestrian. The V2X terminal obtains a certificate from the certificate issuance server, and directly or indirectly obtains a certificate revocation list (CRL) from the certificate revocation server. The CRL is generated by the certificate revocation server to record information about a revoked certificate. The V2X terminal reports a status, running information, and exception information of the V2X terminal to the V2X server. The V2X server may directly request the certificate revocation server to revoke a certificate of a V2X terminal, or may request the certificate revocation server to revoke a certificate of a V2X terminal by using the certificate issuance server.

Figure 2:
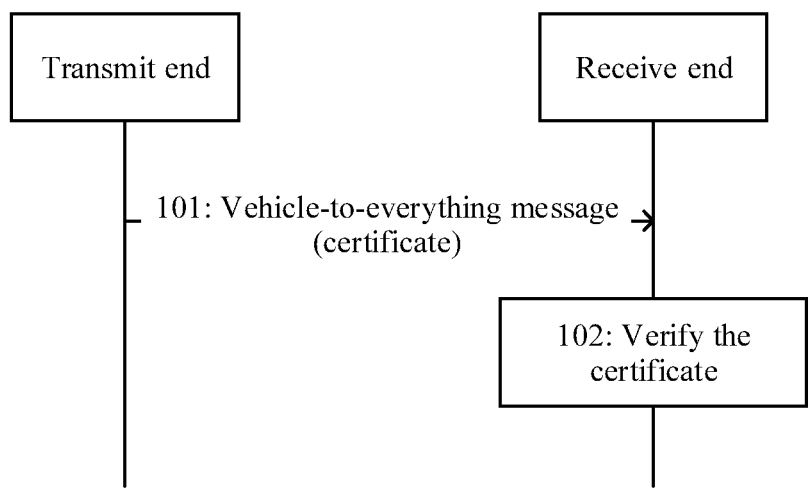
FIG. 2 is a flowchart of a V2X communication method according to an embodiment.

FIG. 2 is a schematic diagram of a V2X communications service procedure according to an embodiment. The communication procedure involves two V2X terminals, apparatuses, or devices that are used as a transmit end and a receive end based on different communication roles.

The transmit end adds a certificate of the transmit end to a message sent in step 101. The certificate sent by the transmit end includes classification information. The classification information is category information allocated by a certificate issuance server to the certificate when the certificate is issued, and is used to classify the certificate. A classification dimension is not limited. A geographic orientation may be used as a dimension. For example, a geographic orientation of the certificate issuance server is used as the classification information. Alternatively, an administrative region may be used as a dimension. For example, an administrative region of the certificate issuance server is used as the classification information. A format and a length of the classification information are not limited. The classification information may be multi-level classification information including a plurality of levels, or may be one-level classification information. The classification information may be carried in a plurality of manners. In this embodiment, a V2X certificate format defined in the Institute of Electrical and Electronics Engineers (IEEE) 1609.2 standard is used as an example to list several possible manners of carrying the classification information in the certificate.

```
IEEE1609.2 CertificateBase {
    ...
    toBeSigned {
        id,
        cracaId,
        crlSeries,
        region,
        ...}
    ...,
}
```

Manner 1: The classification information is carried by using a certificate identifier ID field. Two-level classification information is used as an example. A format of the certificate identifier ID field is defined as "level-1 classification information|level-2 classification information|feature information", where "|" is a concatenation operator. When the administrative region of the certificate issuance server is used as the classification information, the level-1 classification information may be information about a province in which the certificate issuance server is located, and the level-2 classification information may be information about a city in which the certificate issuance server is located. In Manner 1, the feature information is information that is allocated by the certificate issuance server to the certificate when the certificate is generated and that is used to identify the certificate, and the feature information may be recorded in any defined field of the certificate. In a possible implementation, the feature information may be a binary number that is of n bytes and that is generated by using a random number generator. In Manner 1, feature information of two certificates having different classification information may be the same. It is assumed that a length of the level-1 classification information is 1 byte, a length of the level-2 classification information is 1 byte, and n is 1, a possible value of an ID of the certificate is "100010000001000111111110", where "10001000" is the level-1 classification information of the certificate, "00010001" is the level-2 classification information of the certificate, and "11111110" is a random number.

Manner 2: The classification information is carried by using a region field. A format of the region field is defined as "level-1 classification information|level-2 classification information".

Manner 3: The classification information is carried by using a crlSeries certificate revocation series field, or the classification information is carried by using a cracaId certificate revocation server identifier and a crlSeries field. For example, a format of the crlSeries field is defined as "level-1 classification information|level-2 classification information". Alternatively, the level-1 classification information is carried by using the cracaId field, and the level-2 classification information is carried by using the crlSeries field. For example, the cracaId field records an identifier of a certificate revocation server that is responsible for revoking the certificate, and is used as the level-1 classification information. The crlSeries field records a CRL series to which the certificate belongs once the certificate is revoked, and is used as the level-2 classification information.

Before processing the message, in step 102, the receive end first verifies, based on a locally stored certificate revocation list CRL, whether the certificate is revoked. If the certificate is revoked, the receive end directly discards the message. Before verifying the certificate, the receive end directly or indirectly obtains the CRL from the certificate revocation server. Corresponding to the classification information included in the certificate, the CRL locally stored on the receive end also needs to record classification information of a revoked certificate. In addition, the CRL further needs to record feature information of the revoked certificate. A field that records the classification information of the revoked certificate in the CRL may be any field. For ease of description, the field that records the classification information of the revoked certificate is uniformly referred to as a revocation identifier, and the revocation identifier is used to uniquely identify one revoked certificate in the CRL. The following is a CRL format defined in the IEEE 1609.2 standard. It is assumed that a field that has a revocation identifier function is an ID field in the CRL. In addition, it is assumed that the ID field records the feature information of the revoked certificate. Certainly, another field different from a revocation identifier field may be selected to record the feature information of the revoked certificate.

```
CrlContents ::= SEQUENCE {
    ...
    typeSpecific CHOICE {
        ...
        entries SequenceOfHashBasedRevocationInfo {
            id,
            ...,
        }
    }
    ...,
}
```

The two-level classification information is used as an example. A format of the ID field in the CRL is defined as "level-1 classification information|level-2 classification information|feature information of the revoked certificate", where "|" is a concatenation operator. Feature information of any certificate may be a random number of n bytes, or may be a value of n bytes intercepted after hash calculation is performed on the certificate, and the feature information of the certificate is used to uniquely identify one certificate. When the feature information of the revoked certificate is the random number of the n bytes, the random number of the n bytes may be information extracted from a defined field in the revoked certificate. For example, corresponding to Manner 1 in which the certificate includes the classification information, the random number of the n bytes is intercepted from an identifier of the revoked certificate. The level-1 classification information may be information about a province in which the certificate issuance server of the revoked certificate is located, and the level-2 classification information may be information about a city in which the certificate issuance server of the revoked certificate is located. It is assumed that a length of the level-1 classification information is 1 byte, a length of the level-2 classification information is 1 byte, and n is 1, a possible value of an ID in the CRL is "100010000001000111111110", where "10001000" is the level-1 classification information of the revoked certificate, "00010001" is the level-2 classification information, and "11111110" is the random number intercepted from the identifier of the revoked certificate.

Figure 3:
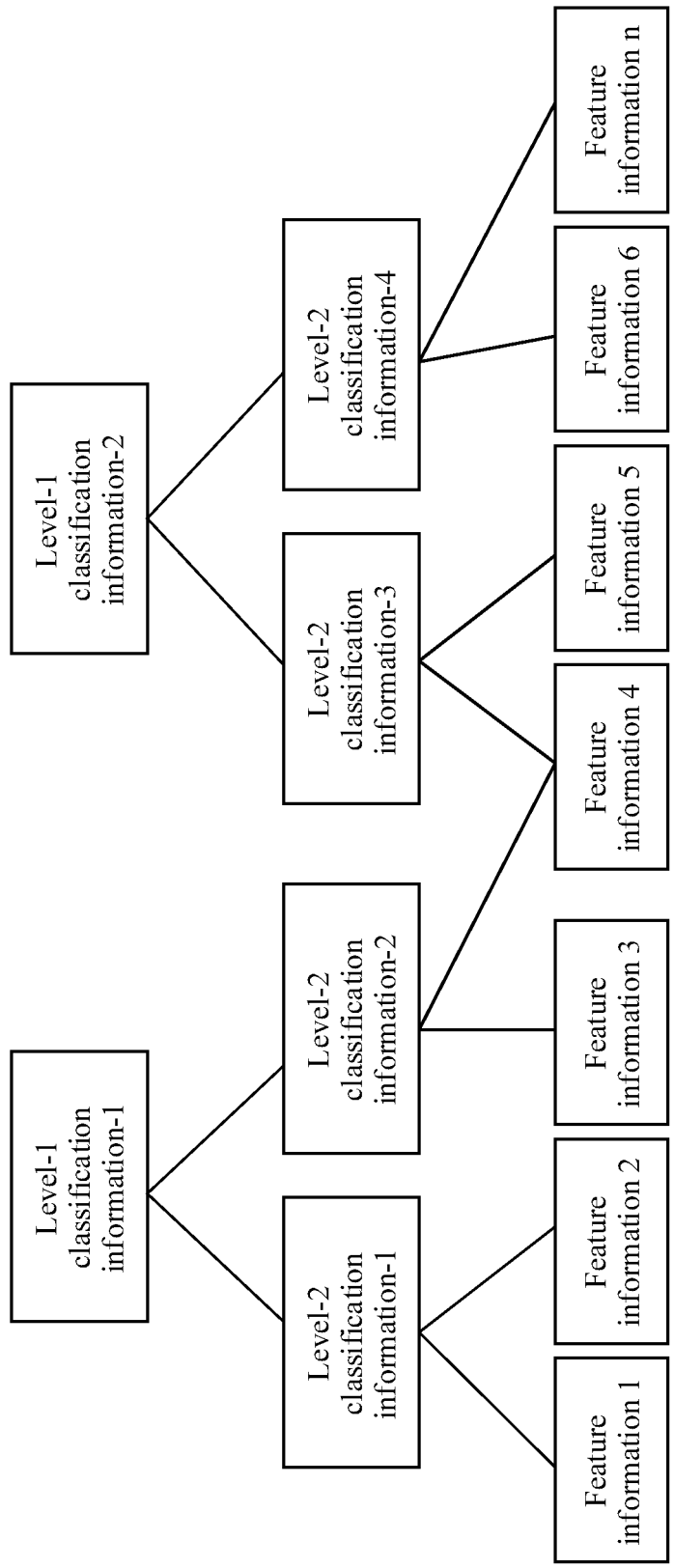
FIG. 3 is a schematic structural diagram of classifying a certificate according to an embodiment.

Based on the foregoing definition, when verifying the certificate in step 102 in FIG. 2, the receive end may quickly and efficiently match the classification information included in the received certificate and the extracted feature information of the received certificate with the revocation identifier in the CRL, to determine whether the certificate of the transmit end is revoked. As shown in FIG. 3, the revocation identifier recorded in the CRL list may be classified into different sets and subsets based on the classification information. It is assumed that a value of an ID carried in the certificate received by the receive end is "100010000001000111111110". In the CRL locally stored on the receive end, level-1 classification information of the revocation identifier may be classified into two categories, namely, level-1 classification information-1 and level-1 classification information-2. A value of the level-1 classification information-1 is "10001000". When the receive end verifies whether the certificate is revoked, only a revocation identifier whose level-1 classification information is the level-1 classification information-1 needs to be matched and searched. Then, the receive end continues to narrow a matching and searching range based on level-2 classification information "00010001" included in the ID in the received certificate, and the level-1 classification information is a revocation identifier of "00010001". When there is multi-level classification information, similarly, the receive end gradually narrows down, based on classification information of different levels, a range that needs to be matched and searched, finally determines a subset that needs to be matched and searched based on the feature information of the certificate, and matches the feature information of the received certificate and feature information included in the revocation identifier. If there is a matching record, it is determined that the received certificate is revoked. If there is no matching record, it is determined that the received certificate is not revoked. If there is no the classification information of the received certificate in the CRL, it may be directly determined that the received certificate is not revoked.

It should be noted that, in this embodiment, a definition of the feature information of the certificate received by the receive end needs to be agreed on, and is consistent with a definition of the feature information that is of the revoked certificate and that is recorded in the revocation identifier in the CRL. If the feature information that is of the revoked certificate and that is recorded in the revocation identifier in the CRL is defined as a random number of n bytes at a specified location in the identifier of the revoked certificate, the receive end extracts a random number of n bytes at a specified location from an identifier of the received certificate when verifying the certificate. If the feature information that is of the revoked certificate and that is recorded in the revocation identifier in the CRL is defined as interpreting the n bytes at the specified location after hash calculation is performed on the revoked certificate, the receive end intercepts the n bytes at the specified location after hash calculation is performed on the received certificate when verifying the certificate.

It can be learned from the method in the foregoing embodiment that, the certificate and the CRL revocation identifier include the classification information, and when verifying whether the certificate is revoked, the receive end can narrow the searching and matching range based on the classification information. When a large quantity of records are stored in the CRL, calculation workload of verifying the certificate by the receive end can be greatly reduced, speed and efficiency of verifying the certificate is improved, and real-time service requirements in V2X communication is met.

Figure 4:
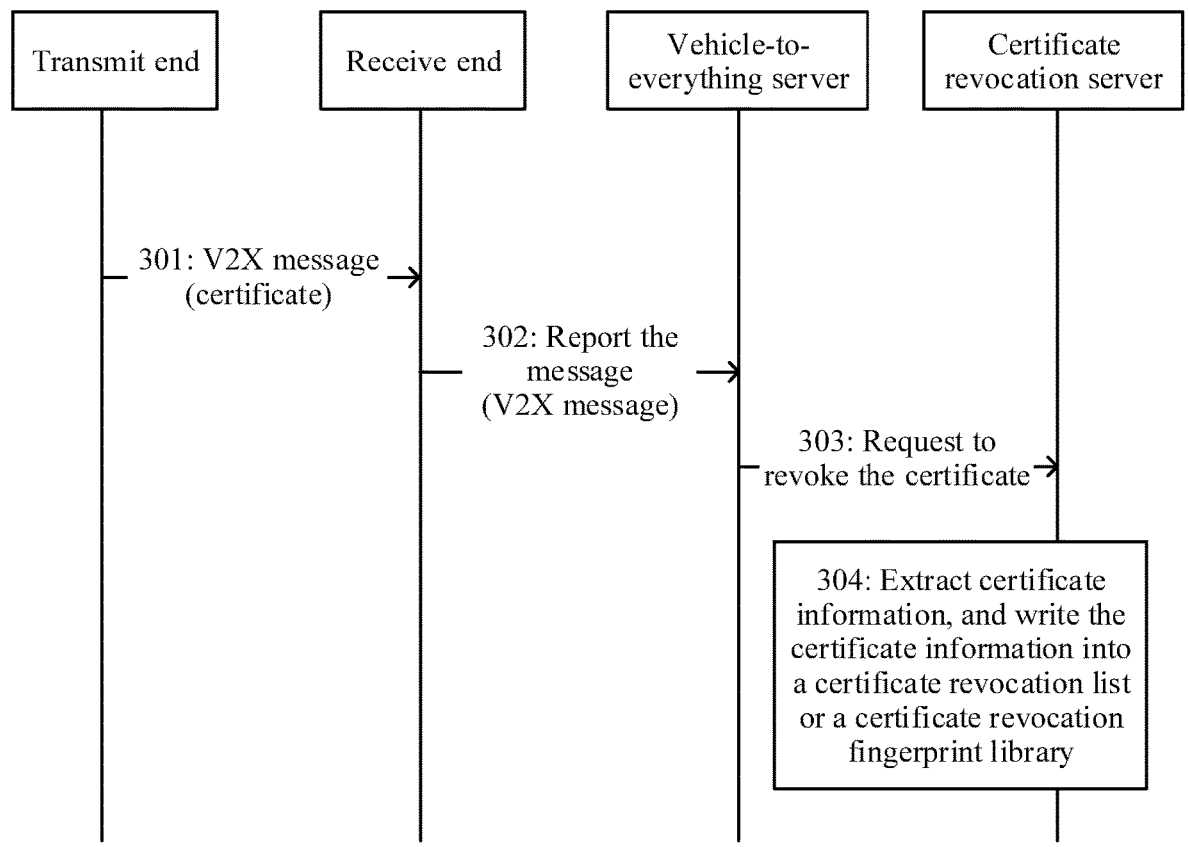
FIG. 4 is a flowchart of a certificate revocation method according to an embodiment.

As described in the embodiment in FIG. 2, the CRL is generated by the certificate revocation server. FIG. 4 is a schematic flowchart of a method in which a certificate revocation server revokes a certificate and adds a revocation identifier including classification information to a CRL.

301 and 302: A receive end receives a V2X message, where the V2X message includes a certificate of a transmit end that sends the message. The receive end determines that there is an exception, and the exception includes: a frequency of sending the message is excessively high, signature information included in the message is incorrectly verified, or the certificate is not in a validity period. If the exception occurs, the V2X message including the certificate is sent to a V2X server, to request the V2X server to perform further security determining and processing.

303: The V2X server receives the V2X message including the certificate, performs determining and decision-making according to a local policy, determines that the certificate needs to be revoked, and sends a message to the certificate revocation server, to request the certificate revocation server to revoke the certificate, where the message carries the certificate. It should be noted that the V2X server may directly send the message to the certificate revocation server, to request to invoke the certificate, or may send the message to the certificate revocation server by using a certificate issuance server, to request to invoke the certificate. For example, when the V2X server is not granted permission to be written into the certificate revocation server, the V2X server needs to send the message to the certificate revocation server by using the certificate issuance server.

304: The certificate revocation server adds a revocation identifier record to the CRL based on a request of the V2X server, extracts classification information and feature information of the certificate based on a format of the certificate, and writes the classification information of the certificate into an added revocation identifier. A manner in which the certificate revocation server extracts the classification information of the certificate corresponds to the manner of carrying the classification information described in the embodiment shown in FIG. 2. Specifically, corresponding to the three manners of carrying the classification information described in the embodiment shown in FIG. 2, the certificate revocation server extracts the classification information in the ID field, the region field, or the crlSeries field of the certificate, and uses the classification information as classification information of the added revocation identification field in the CRL. A manner in which the certificate revocation server extracts the feature information of the certificate corresponds to the format of the certificate described in the embodiment shown in FIG. 2. When a random number of n bytes included in a defined field of the certificate, for example, the ID field, is used as the feature information of the certificate, the certificate revocation server extracts the random number of the n bytes from the defined field of the certificate, and uses the random number as feature information of a revoked certificate. In other cases, after hash calculation is performed on the certificate, the n bytes are intercepted as the feature information of the revoked certificate. When both the classification information and the feature information are recorded in the revocation identifier field, the information is recorded in a format of "classification information|feature information of the revoked certificate".

It should be noted that, when the feature information of the certificate and the feature information that is of the revoked certificate and that is recorded in the CRL each are a hash value, hash algorithms used by the receive end and the certificate revocation server need to be consistent. Specifically, the hash algorithm used by the receive end to perform hash calculation on the received certificate in step

102 is consistent with the hash algorithm used by the certificate revocation server to perform hash calculation on the revoked certificate in step 304.

Optionally, a method for extracting certificate information performed by the certificate revocation server in step 304 may further be performed by the V2X server before the request of invoking the certificate is sent in step 303. In other words, as an alternative solution of step 303, the V2X server receives the V2X message including the certificate, performs determining and decision-making according to the local policy, and determines that the certificate needs to be revoked. The V2X server extracts the classification information and the feature information of the certificate, and sends the extracted classification information and the extracted feature information of the certificate to the certificate revocation server, to request the certificate revocation server to revoke the certificate.

The foregoing describes, with reference to the steps in FIG. 4, a procedure of adding the revoked certificate to the CRL. Because a record of the revoked certificate keeps changing, after obtaining the CRL from the certificate revocation server, a V2X communications unit further needs to obtain change information of the CRL from the certificate revocation server, and update a locally stored CRL.

Figures 5, 6:
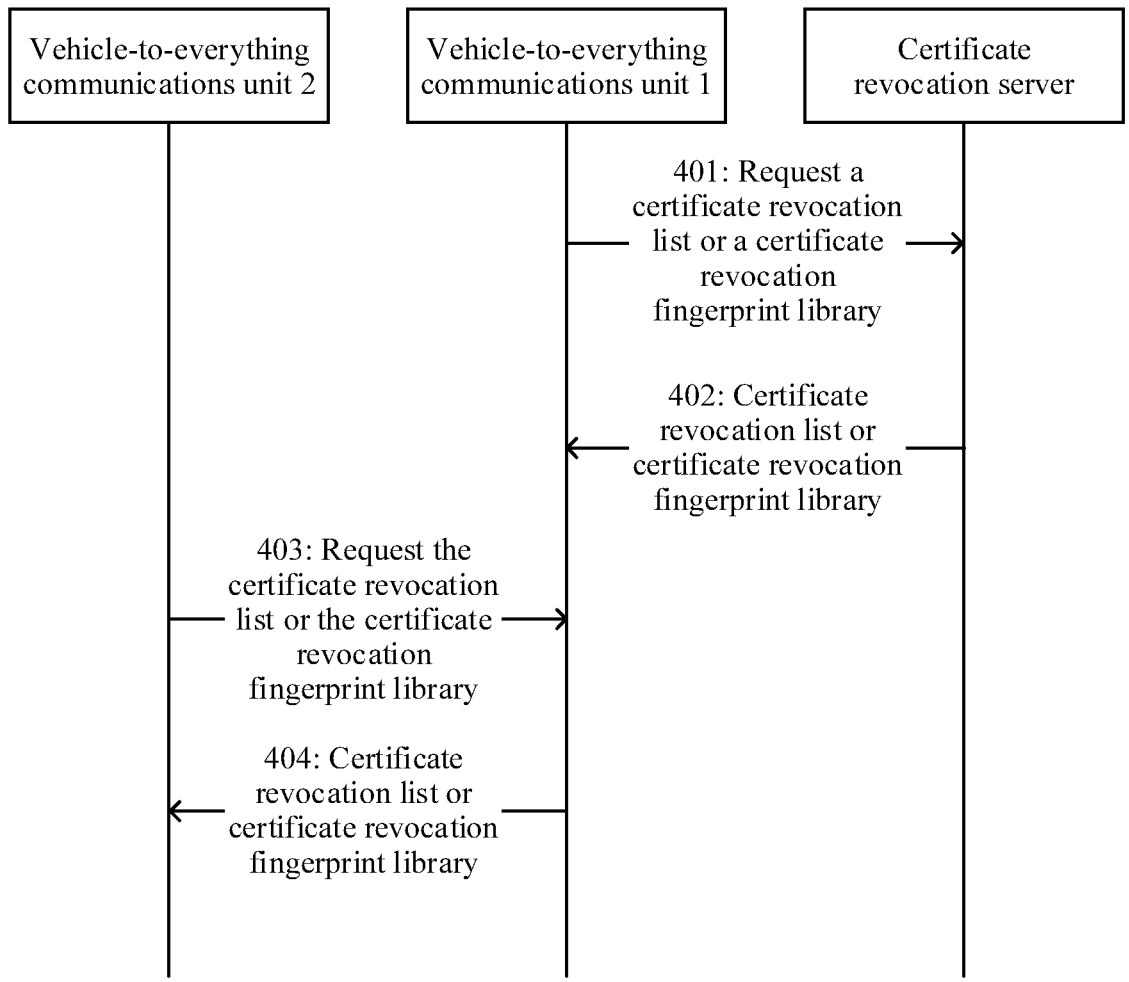
FIG. 5 is a flowchart of a method for obtaining revoked certificate information from a certificate revocation server according to an embodiment.
FIG. 6 is a schematic diagram of a data structure of a certificate revocation fingerprint library.

FIG. 5 is a schematic flowchart of a method for obtaining a CRL by a V2X communications unit according to an embodiment of the present disclosure. The V2X communications unit may actively request, according to a preset triggering condition, to obtain the CRL from a certificate revocation server, as shown in step 401. Alternatively, a certificate revocation server may directly broadcast or unicast the CRL to the V2X communications unit according to a preset policy or rule. To be specific, a message in 402 may be a response to a message in 401, and the message may alternatively be a message actively pushed by the certificate revocation server. It should be noted that the V2X communications unit may alternatively indirectly obtain the CRL from another V2X communications unit, as shown in steps 403 and 404. A V2X communications unit 2 may obtain the CRL from a V2X communications unit 1 that obtains the CRL, and a message in 404 may be a response to a request in 403. Alternatively, the V2X communications unit 1 may actively push the CRL to the V2X communications unit 2 in a broadcast or unicast manner.

A triggering condition for the V2X communications unit to actively request to obtain the CRL may be event triggering, for example, vehicle ignition is started, or may be periodic triggering, for example, a periodic timer expires, or may be specific condition triggering, for example, a predetermined region or a predetermined speed threshold is reached.

The CRL carried in the message in 402 or 404 by the certificate revocation server or the V2X communications unit may be a full CRL or a differential CRL. The full CRL includes information about all certificates revoked by the certificate revocation server, and the differential CRL includes two lists: an added CRL and a deleted CRL. The added CRL includes only information about an added revoked certificate in a time period by comparing full CRL corresponding to an end time point of the time period with full CRL corresponding to a start time point of the time period. The deleted CRL includes only information about a reduced revoked certificate in a time period by comparing full CRL corresponding to an end time point of the time period with full CRL corresponding to a start time point of the time period. If a differential update solution is used, after obtaining the full CRL for the first time, the V2X communications unit obtains the differential CRL in the message in 402 or 404 subsequently, and the V2X communications unit needs to refresh a locally stored CRL based on the two lists: the added CRL and the deleted CRL. If a full update solution is used, the V2X communications unit obtains the full CRL in the message in 402 or 404, and the V2X communications unit directly replaces a locally stored CRL with the received full CRL.

The foregoing embodiment describes the method about how the certificate revocation server generates the CRL including the classification information and the feature information of the revoked certificate, how the V2X communications unit obtains the CRL including the classification information and the feature information of the revoked certificate from the certificate revocation server, and how the V2X communications unit extracts the classification information and the feature information of the certificate from the message and matches the classification information and the feature information with the record in the CRL to determine whether the certificate carried in the message is revoked when receiving the message.

Because a quantity of V2X terminals is large, and a quantity of certificates issued in a V2X system is also large, correspondingly, a quantity of revoked certificates is relatively large. In addition to the foregoing CRL solution, this embodiment further proposes a solution that is based on a certificate revocation fingerprint library, to reduce impact caused by storing information about the revoked certificate on storage space of the V2X communications unit. The certificate revocation fingerprint library is a binary array whose length is N and that is initialized to 0. The certificate revocation fingerprint library records fingerprint information of a revoked certificate. The fingerprint information of the revoked certificate is bit information whose value is 1 in the binary array whose length is N, and N is a positive integer greater than 0. The fingerprint information of the revoked certificate may be obtained by calculating the revoked certificate by using a plurality of algorithms. For example, the fingerprint information of the revoked certificate may be obtained by performing hash calculation.

As shown in FIG. 6, it is assumed that the certificate revocation fingerprint library is a binary array whose length is 16 and that is initialized to 0. In step 304 of the procedure shown in FIG. 4, when the certificate revocation server needs to record a revoked certificate, the certificate revocation server separately performs hash calculation and mapping on the revoked certificate by using three hash functions (for example, performs a modulo operation on a length of the binary array in the fingerprint library by using a hash calculation result). A value is generated for each mapping. Each value corresponds to one bit in the binary array. A corresponding bit is set to 1. Information about the three bits whose values are 1 are the fingerprint information of the revoked certificate.

In the method procedure shown in FIG. 2, the receive end receives the V2X message including the certificate, calculates fingerprint information of the certificate, and matches the fingerprint information of the certificate in the certificate revocation fingerprint library. If there is same fingerprint information, the certificate is revoked. It should be noted that a format of the certificate may be the format that includes the classification information and that is described in the embodiments, or may be another format.

In the method procedure shown in FIG. 5, the V2X communications unit obtains the certificate revocation fingerprint library in step 402 or 404. The certificate revocation fingerprint library may be a full certificate revocation fingerprint library that includes fingerprint information of all revoked certificates, or may be a differential certificate revocation fingerprint location library. The differential certificate revocation fingerprint location library records bit information that changes in a time period by comparing a full certificate revocation fingerprint library corresponding to an end time point of the time period with a full certificate revocation fingerprint library corresponding to a start time point of the time period.

For example, if the full certificate revocation fingerprint library recorded in the certificate revocation server includes fingerprints of two revoked certificates A and B, a fingerprint length is 10, the fingerprint of A is "0010010001", and the fingerprint of B is "0001110000", the full certificate revocation fingerprint library is "0011110001". If a revoked certificate C needs to be added in step 304, it is assumed that a fingerprint of C is "1100001000", by comparing with the general fingerprint library "0011110001", it is found that values of the fourth bit, the ninth bit, and the tenth bit from the right each change from 0 to 1. In this case, changing of the values of the fourth bit, the ninth bit, and the tenth bit is recorded in the differential certificate revocation fingerprint location library, and a specific recording manner is not limited. A bit that changes may be set to 1 in a form of a binary array, or may be set in a form of an enumeration or an array, and only a sequence number of the bit that changes is recorded. If the fingerprint of the certificate B needs to be deleted from the full certificate revocation fingerprint library, an updated full certificate revocation fingerprint library is "0010010001". Bits that change are the sixth bit and the seventh bit from the right, and changing of values of the sixth bit and the seventh bit is recorded in the differential certificate revocation fingerprint location library.

If the differential certificate revocation fingerprint location library is received, the V2X communications unit performs a negative operation on a value of a corresponding bit in a locally stored certificate revocation fingerprint library based on bit information recorded in the differential certificate revocation fingerprint location library, to obtain a latest certificate revocation fingerprint library. If the full certificate revocation fingerprint library is received, the locally stored certificate revocation fingerprint library is replaced.

1 in the certificate revocation fingerprint library is not bound to a specific revoked certificate. Therefore, when the V2X communications unit verifies the certificate in step 102, there may be a false positive. For example, when the certificate revocation fingerprint library records a large amount of fingerprint information, in the certificate revocation fingerprint library, bits corresponding to fingerprint information of one to-be-confirmed certificate may all be set to 1, and these bits may not necessarily correspond to a same fingerprint of a revoked certificate.

Figure 7:
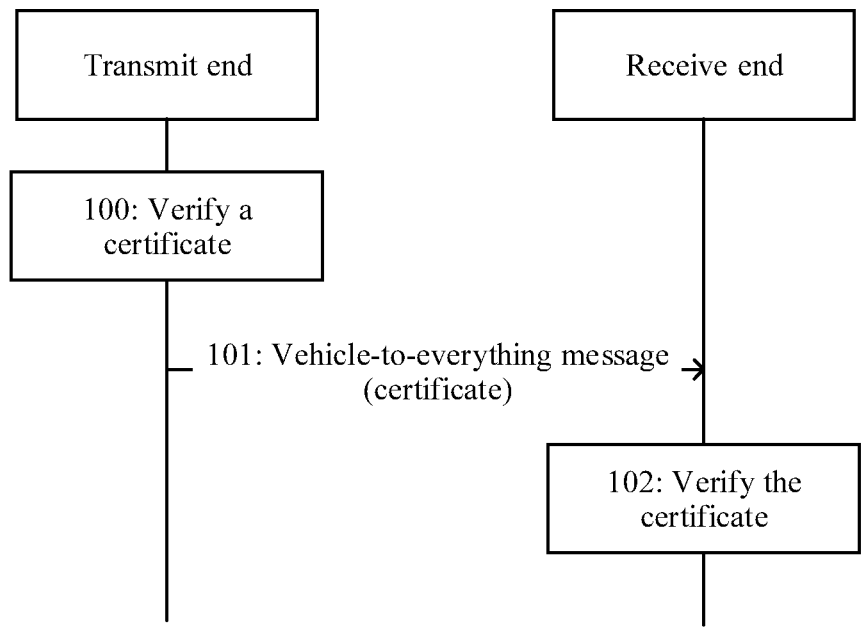
FIG. 7 is a flowchart of a V2X communication method for self-verifying a certificate according to an embodiment.

As a transmit end, before sending the message in step 101, to avoid discarding the message sent by the transmit end due to a false positive of the receive end, the V2X communications unit first uses the locally stored certificate revocation fingerprint library to self-verify whether the fingerprint information of the certificate has a matching record in the certificate revocation fingerprint library, to ensure that the message carries a certificate that does not have a matching record in the certificate revocation fingerprint library, as shown in step 100 in FIG. 7. Generally, the certificate issuance server issues a plurality of certificates to the V2X communications unit at a time. The V2X communications unit selects one certificate that has no matching record in the certificate revocation fingerprint library from these certificates. If there is no available certificate locally, the V2X communications unit re-applies to the certificate issuance server for the certificate.

Figure 8:
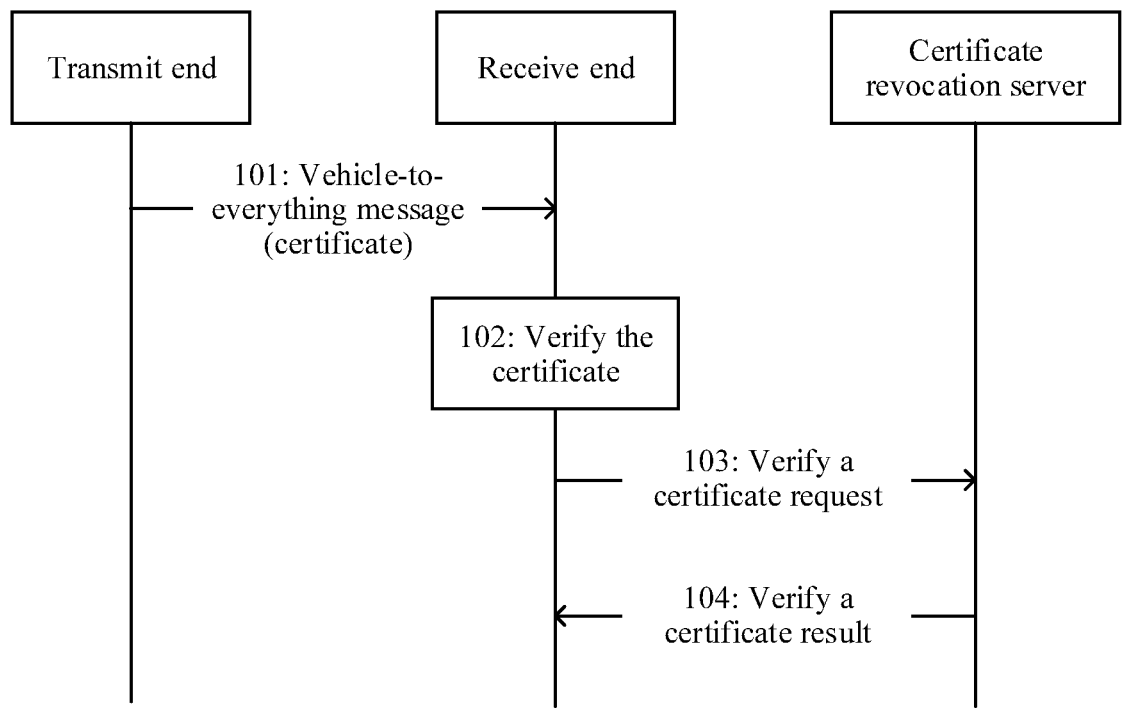
FIG. 8 is a flowchart of a certificate status confirming method according to an embodiment.

As the receive end, in step 102, if determining that there is the fingerprint information of the certificate in the message in the certificate revocation fingerprint library, to avoid a false positive, the V2X communications unit requests the certificate revocation server to verify the certificate, as shown in step 103 in FIG. 8, and a request message includes the certificate or information about the certificate. The certificate revocation server stores not only the fingerprint information of the revoked certificate, but also information such as the CRL. Therefore, a verification result of the certificate revocation server is more accurate. The V2X communications unit, as the receive end, finally processes a V2X message based on the verification result returned by the certificate revocation server in step 104. If the verification result returned by the certificate revocation server indicates that the certificate is not revoked, the receive end continues to process the V2X message. If the verification result returned by the certificate revocation server indicates that the certificate is revoked, the receive end discards the V2X message.

Both of the solution that is based on the certificate revocation list and the solution that is based on the certificate revocation fingerprint library in the embodiments are intended to improve efficiency and a speed of verifying the certificate by the V2X terminal or the V2X communications unit in the V2X communication, so as to improve real-time performance of message processing, and reduce impact of verifying the certificate on performance of the V2X terminal or the V2X communications unit. Compared with the solution that is based on the certificate revocation list, the certificate revocation fingerprint library solution has a lower requirement on storage space of the V2X terminal or the V2X communications unit. The V2X terminal or the V2X communications unit only needs to occupy a small amount of storage space to store the certificate revocation fingerprint library. However, the solution that is based on the certificate revocation fingerprint library may have a specific false positive probability. Therefore, in addition to verifying the certificate by the receive end, additional processing is required to improve accuracy of verifying the certificate.

It should be noted that the solution that is based on the certificate revocation list and the solution that is based on the certificate revocation fingerprint library may be independently applied, or may be applied in combination. When the two solutions are applied in combination, a format of the certificate is the format that includes the classification information and that is described in the solution that is based on the certificate revocation list. The certificate revocation server stores both the CRL and the certificate revocation fingerprint library, and the V2X communications unit stores only the certificate revocation fingerprint library. In a scenario in which the two solutions are applied in combination:

In step 304, the certificate revocation server refreshes the CRL and the certificate revocation fingerprint library respectively based on the solution that is based on the certificate revocation list and the solution that is based on certificate revocation fingerprint library solution.

In step 402 or step 404, the V2X communications unit obtains and stores only the certificate revocation fingerprint library, to reduce consumption of storage space.

In step 102, the V2X communications unit verifies the certificate by using the solution that is based on the certificate revocation fingerprint library.

In steps 103 and 104, to improve verification accuracy, the V2X communications unit requests the certificate revocation server to verify the certificate, and the certificate revocation server quickly verifies the certificate by using the CRL list.

The foregoing mainly describes the solutions provided in the embodiments of the present disclosure from a perspective of the method procedures. It may be understood that, to implement the foregoing functions, entities such as the V2X communications unit, the V2X server, and the certificate revocation server include corresponding hardware structures and/or software modules for performing the functions. In addition, the V2X server and the certificate revocation server described in the embodiments may be separate physical devices, or may be different logical function entities in a same physical device. To be specific, functions of the V2X server and the certificate revocation server in the embodiments may be implemented in a same physical device. A person of skilled in the art should be easily aware that the method procedures described with reference to the embodiments disclosed in this specification may be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 9:
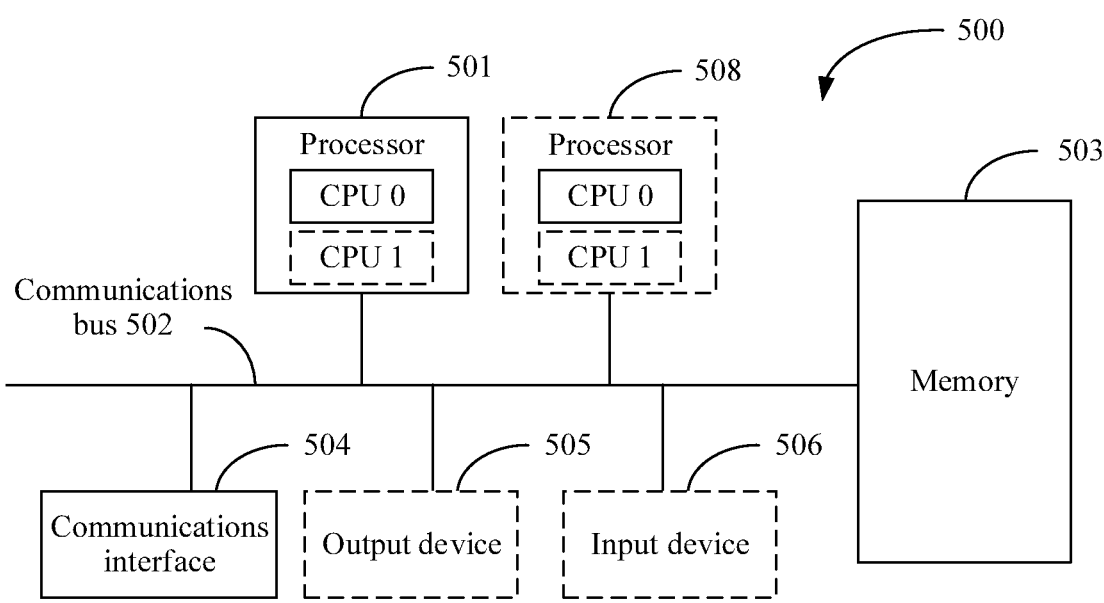
FIG. 9 is a schematic structural diagram of an apparatus according to an embodiment.

For example, the V2X communications unit, the V2X server, and the certificate revocation server in the foregoing embodiments may all be implemented by an apparatus shown in FIG. 9.

The apparatus 500 includes at least one processor 501, a communications bus 502, a memory 503, and at least one communications interface 504.

The processor 501 may be a general-purpose central processing unit (CPU), a microprocessor, an application-specific integrated circuit (ASIC), or one or more integrated circuits configured to control program execution of the solutions of the present disclosure.

The communications bus 502 may include a path used to transmit information between the foregoing components.

The communications interface 504 uses any transceiver-type apparatus, to communicate with another device or a communications network, for example, the Ethernet, a radio access network (RAN), or a wireless LAN (WLAN).

The memory 503 may be a read-only memory (ROM), another type of static storage device that can store static information and an instruction, a random-access memory (RAM), another type of dynamic storage device that can store information and an instruction, an electrically erasable programmable ROM (EEPROM), a compact disc ROM (CD-ROM), another optical disc storage, an optical disc storage (including a compact disc, a laser disc, an optical disc, a digital versatile disc (DVD), a Blu-ray disc, and the like), a disk storage medium or another magnetic storage device, or any other medium that can be used to carry or store expected program code in a form of an instruction or a data structure and that can be accessed by a computer. The memory 503 is not limited thereto. The memory may exist independently, and is connected to the processor through the bus. Alternatively, the memory may be integrated with the processor.

The memory 503 is configured to store application program code for performing the solutions of the present disclosure, and the processor 501 controls the execution.

The processor 501 is configured to execute the application program code stored in the memory 503, to implement functions of the V2X communications unit, the V2X server, and the certificate revocation server in the methods in this specification.

In a specific implementation, in an embodiment, the processor 501 may include one or more CPUs, for example, a CPU 0 and a CPU 1 in FIG. 9.

In a specific implementation, in an embodiment, the apparatus 500 may include a plurality of processors, for example, the processor 501 and a processor 508 shown in FIG. 9. Each of the processors may be a single-core (single-CPU) processor or a multi-core (multi-CPU) processor. The processor herein may be one or more devices, circuits, and/or processing cores for processing data (for example, computer program instructions).

In a specific implementation, in an embodiment, the apparatus 500 may further include an output device 505 and an input device 506. The output device 505 communicates with the processor 501, and may display information in a plurality of manners. For example, the output device 505 may be a liquid-crystal display (LCD), a light-emitting diode (LED) display device, a cathode-ray tube (CRT) display device, or a projector. The input device 506 communicates with the processor 501, and may receive a user input in a plurality of manners. For example, the input device 506 may be a mouse, a keyboard, a touchscreen device, or a sensing device.

When the foregoing apparatus implements the function of the V2X server or the certificate revocation server, the apparatus 500 may be a general-purpose server or a special-purpose server.

When the foregoing apparatus implements the function of the V2X communications unit in the embodiments, the apparatus 500 may be a telematics box (T-Box) or a multi-domain controller (MDC) integrated in a vehicle. Optionally, the apparatus 500 may alternatively be a chip integrated in the vehicle. In this case, a function/implementation process of the communications interface 504 may alternatively be implemented by using a pin, a circuit, or the like. The memory is a storage unit in the chip, for example, a register or a cache. The storage unit may alternatively be a storage unit located outside the chip.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The objectives, technical solutions, and benefits of the present disclosure are further described in detail in the foregoing specific implementations. A person skilled in the art should understand that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

What is claimed is:

1. A method implemented by a receive end and comprising:
   receiving, from a transmit end, a message comprising a transmit end certificate of the transmit end, wherein the transmit end certificate comprises first classification information, and wherein the first classification information comprises first level-1 classification information and first level-2 classification information;
   determining, based on the first classification information, a set of revocation identifiers in a certificate revocation list, wherein the revocation identifiers comprise a first revocation identifier identifying a first revoked certificate in the certificate revocation list, wherein the first revocation identifier comprises second classification information of the first revoked certificate, wherein the second classification information is the same as the first classification information, and wherein determining the set of revocation identifiers comprises:
      determining a first set of revocation identifiers in the certificate revocation list based on the first level-1 classification information, wherein second level-1 classification information in revocation identifiers in the first set is the same as the first level-1 classification information; and
      determining, based on the first level-2 classification information, a second set of revocation identifiers in the first set, wherein second level-2 classification information in revocation identifiers in the second set is the same as the first level-2 classification information;
   extracting first feature information of the transmit end certificate;
   performing matching of the first feature information with second feature information of the first revoked certificate; and
   determining, based on a result of the matching, a status of the transmit end certificate.

2. The method of claim 1, wherein third feature information in the first revocation identifier is a random number of N bytes in a first defined field of the first revoked certificate, wherein N is a positive integer greater than 0, and wherein extracting the first feature information comprises intercepting the N bytes from the first defined field and using the N bytes as the first feature information.

3. The method of claim 1, wherein third feature information in the first revocation identifier is a hash value of M bytes and is based on a hash operation on the first revoked certificate, wherein M is a positive integer greater than 0, and wherein extracting the first feature information comprises performing the hash operation on the transmit end certificate to obtain the hash value and using the hash value as the first feature information.

4. The method of claim 1, wherein the first classification information is in a second defined field of the transmit end certificate.

5. The method of claim 4, wherein the second defined field is a certificate identifier field of the transmit end certificate, a region field of the transmit end certificate, or a certificate revocation series field of the transmit end certificate.

6. The method of claim 1, before determining the set of revocation identifiers, the method further comprises obtaining the certificate revocation list from a certificate revocation server.

7. The method of claim 6, wherein obtaining the certificate revocation list comprises:
   obtaining a full certificate revocation list from the certificate revocation server;
   obtaining a differential certificate revocation list from the certificate revocation server, wherein the differential certificate revocation list comprises an added certificate revocation list and a deleted certificate revocation list, wherein the added certificate revocation list comprises an added revocation identifier in comparison with the full certificate revocation list, and wherein the deleted certificate revocation list comprises a deleted revocation identifier in comparison with the full certificate revocation list; and
   refreshing the full certificate revocation list based on the differential certificate revocation list.

8. The method of claim 1, wherein determining the status of the transmit end certificate comprises determining that the transmit end certificate is revoked when the first feature information is the same as the second feature information or that the transmit end certificate is not revoked when the first feature information is not the same as the second feature information.

9. The method of claim 1, wherein the receive end or the transmit end is an on-board unit (OBU) or a roadside unit (RSU).

10. A method implemented by a receive end and comprising:
    obtaining a certificate revocation fingerprint library from a certificate revocation server or a vehicle-to-everything communications unit by:
       obtaining a full certificate revocation fingerprint library comprising fingerprint information of all revoked certificates;
       obtaining a differential certificate revocation fingerprint location library that records bit information of changes to the full certificate revocation fingerprint library; and
       performing, based on the differential certificate revocation fingerprint location library, a negation operation on a value corresponding to a bit that changes in the full certificate revocation fingerprint library;
    receiving, from a transmit end, a message comprising a transmit end certificate of the transmit end;
    calculating first fingerprint information of the transmit end certificate based on the transmit end certificate;

determining that second fingerprint information of a revoked certificate in the certificate revocation fingerprint library matches the first fingerprint information;

sending, to the certificate revocation server, the transmit end certificate to request verification of a status of the transmit end certificate;

receiving, from the certificate revocation server in response to the transmit end certificate, a verification result; and determining the status based on the verification result.

11. The method of claim 10, further comprising discarding the message when the transmit end certificate is revoked.

12. A vehicle-to-everything communications unit comprising:

an interface configured to receive, from a transmit end, a message comprising a transmit end certificate of the transmit end, wherein the transmit end certificate comprises first classification information, and wherein the first classification information comprises first level-1 classification information and first level-2 classification information; and a processor coupled to the interface and configured to:

determine, based on the first classification information, a set of revocation identifiers in a certificate revocation list, wherein the revocation identifiers comprise a first revocation identifier identifying a first revoked certificate in the certificate revocation list, wherein the first revocation identifier comprises second classification information of the first revoked certificate, wherein the second classification information is the same as the first classification information, wherein the processor is configured to determine the set of revocation identifiers by:

determining a first set of revocation identifiers in the certificate revocation list based on the first level-1 classification information, wherein second level-1 classification information in revocation identifiers in the first set is the same as the first level-1 classification information; and determining, based on the first level-2 classification information, a second set of revocation identifiers in the first set, wherein second level-2 classification information in revocation identifiers in the second set is the same as the first level-2 classification information;

extract first feature information of the transmit end certificate;

perform matching of the first feature information with second feature information of the first revoked certificate; and determine, based on a result of the matching, a status of the transmit end certificate.

13. The vehicle-to-everything communications unit of claim 12, wherein third feature information in the first revocation identifier is a random number of N bytes in a first defined field of the first revoked certificate, wherein N is a positive integer greater than 0, and wherein extracting the first feature information comprises intercepting the N bytes from the first defined field and using the N bytes as the first feature information.

14. The vehicle-to-everything communications unit of claim 12, wherein third feature information in the first revocation identifier is a hash value of M bytes and is based on a hash operation on the first revoked certificate, wherein M is a positive integer greater than 0, and wherein extracting the first feature information comprises performing the hash operation on the transmit end certificate to obtain the hash value and using the hash value as the first feature information.

15. The vehicle-to-everything communications unit of claim 12, wherein the first classification information is in a second defined field of the transmit end certificate.

16. The vehicle-to-everything communications unit of claim 15, wherein the second defined field is a certificate identifier field of the transmit end certificate, a region field of the transmit end certificate, or a certificate revocation series field of the transmit end certificate.

17. The vehicle-to-everything communications unit of claim 12, wherein before determining the first set and determining the second set, the processor is further configured to obtain the certificate revocation list from a certificate revocation server.

18. The vehicle-to-everything communications unit of claim 17, wherein the processor is further configured to obtain the certificate revocation list by:

obtaining a full certificate revocation list from the certificate revocation server;

obtaining a differential certificate revocation list from the certificate revocation server, wherein the differential certificate revocation list comprises an added certificate revocation list and a deleted certificate revocation list, wherein the added certificate revocation list comprises an added revocation identifier in comparison with the full certificate revocation list, and wherein the deleted certificate revocation list comprises a deleted revocation identifier in comparison with the full certificate revocation list; and refreshing the full certificate revocation list based on the differential certificate revocation list.

19. The vehicle-to-everything communications unit of claim 12, wherein the processor is further configured to determine the status of the transmit end certificate by determining that the transmit end certificate is revoked when the first feature information is the same as the second feature information or that the transmit end certificate is not revoked when the first feature information is not the same as the second feature information.

20. The vehicle-to-everything communications unit of claim 12, wherein the vehicle-to-everything communications unit or the transmit end is an on-board unit (OBU) or a roadside unit (RSU).

* * * * *